Dec. 11, 1934.    M. ROSENFELD    1,983,882
AUTOMATIC STOPPING MEANS FOR VEHICLES
Filed Jan. 10, 1934    2 Sheets-Sheet 1
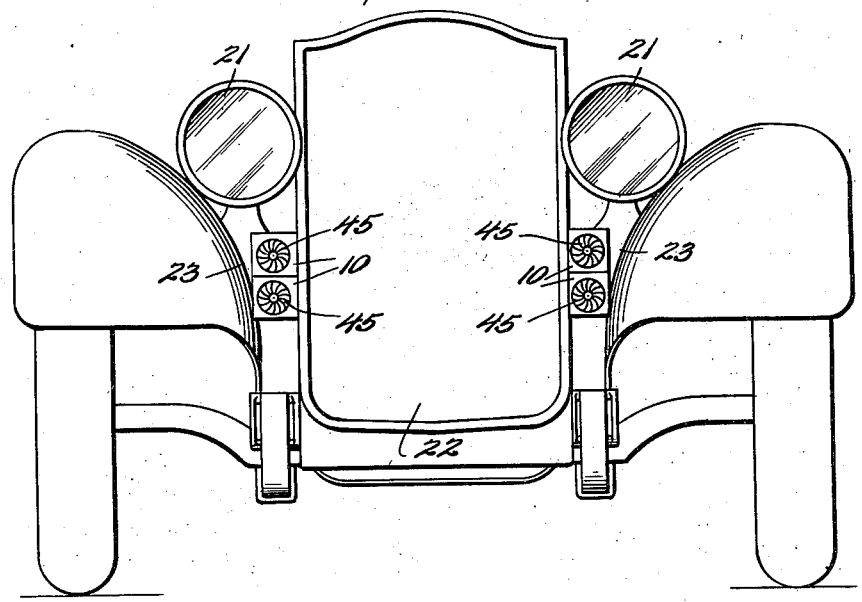
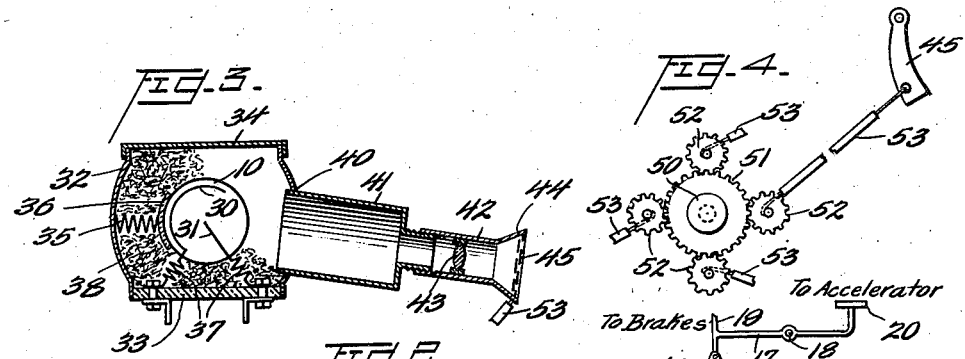
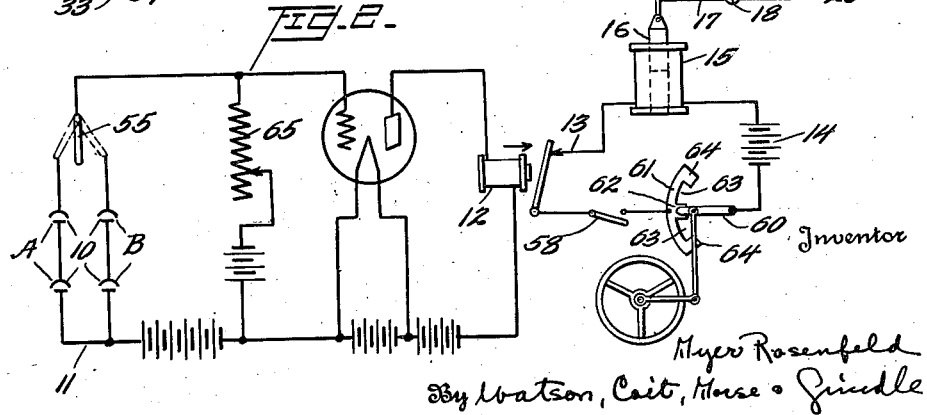

Dec. 11, 1934.  M. ROSENFELD  1,983,882
AUTOMATIC STOPPING MEANS FOR VEHICLES
Filed Jan. 10, 1934  2 Sheets-Sheet 2
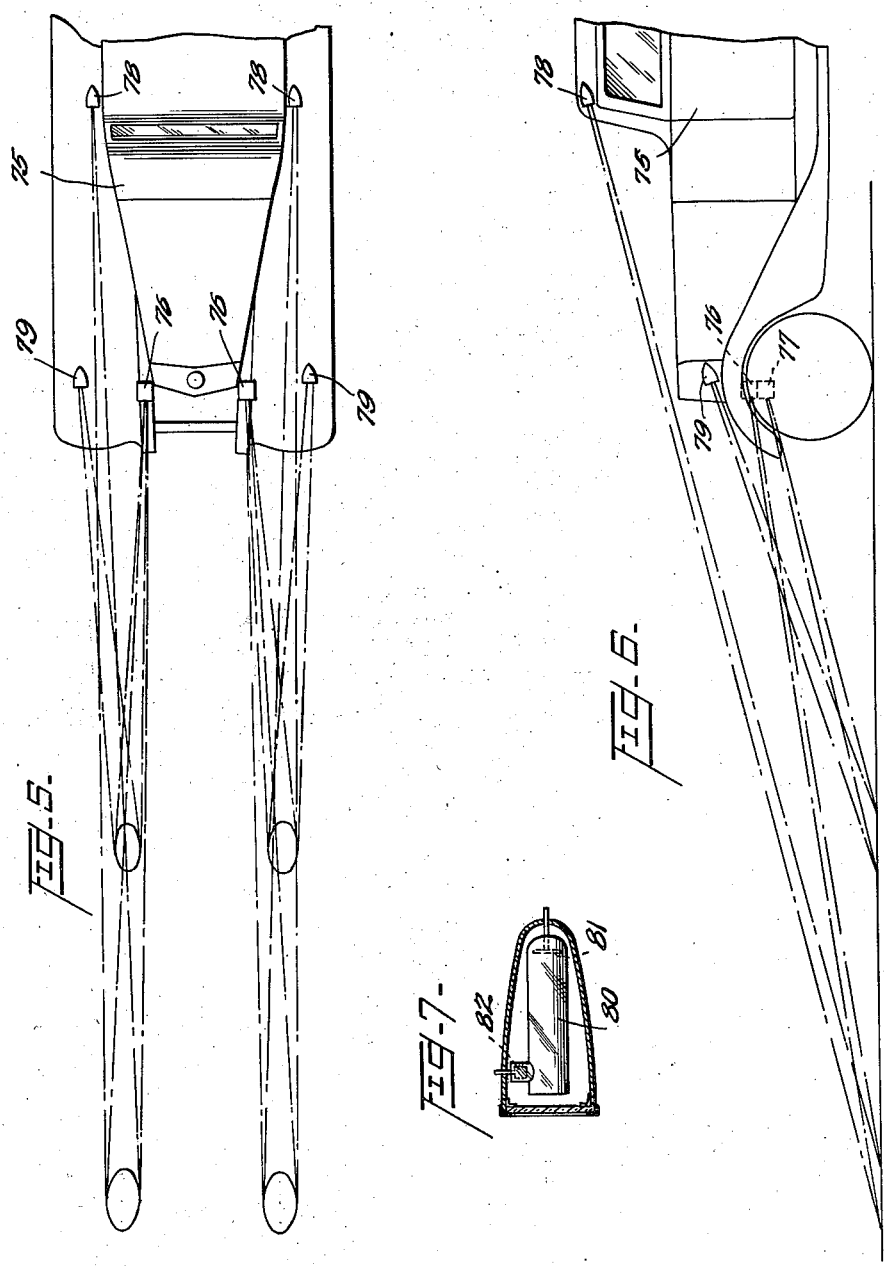
Inventor
Myer Rosenfeld
By Watson, Coit, Morse & Guindle
Attorney Patented Dec. 11, 1934

1,983,882

UNITED STATES PATENT OFFICE 1,983,882

AUTOMATIC STOPPING MEANS FOR VEHICLES

Myer Rosenfeld, Baltimore, Md.

Application January 10, 1934, Serial No. 706,157

17 Claims. (Cl. 180—82)

This invention relates to vehicle controlling apparatus and more particularly to automatic stopping means for self-propelled vehicles.

It is a general object of the present invention to provide novel and improved vehicle control apparatus.

More particularly it is an object of the invention to provide apparatus for self-propelled vehicles which will have the property of immediately stopping the vehicle if it approaches too closely to or is approached too closely by an obstacle, for instance, another vehicle, a fence post, telegraph pole, culvert, abutment or the like.

An important feature of the invention resides in the use of a photo-electric or photo-optical cell carried by the vehicle and in control of the stopping mechanism thereon and having as its "field of vision" certain definite space in front of the vehicle.

A still further feature of one embodiment of the invention resides in the arrangement of the photo-electric cell whereby it is ordinarily exposed to a normal field intensity of light from the atmosphere, in daytime the ordinary daylight as reflected from various objects and at night from light reflected by the road, atmospheric dust particles and the like from the headlights, and wherein a sufficient reduction in this normal intensity of light actuates the vehicle stopping mechanism.

The invention includes the important feature of the arrangement of a lens or similar optical device for focusing the normal light from the field directly ahead of the vehicle onto the sensitive portion of the photo-electric cell and only from a short distance ahead of the vehicle. In other words, the lens may be said to have a depth of focus varying from one or two feet to eight or ten feet ahead of the vehicle. Under ordinary circumstances this exposes the cell to light of normal intensity but upon an obstacle attaining a position within the depth of focus of the lens, its image is immediately cast on the sensitive surface of the photo-electric cell, definitely reducing the light intensity thereon and consequently its generated potential, permitting it to operate the vehicle stopping mechanism to immediately stop the vehicle, so to speak, by the shadow of an impending accident.

In another embodiment of the invention an important feature resides in the arrangement of a photo-electric cell so that its "field of vision" is a definite spot on the roadway at a predetermined distance ahead of the vehicle, which spot is illuminated from a source of light on the vehicle, with focusing means to limit the area of the spot and the area of the "field of vision" of the photo-electric cell so that a change in the position of the spot, as by the light shining on an obstacle or into a ditch or the like, materially reduces the illumination on the cell and causes it to operate the vehicle stopping mechanism.

With this form of the invention several sources of light may be provided, one for each photo-electric cell or several for each cell having overlapping illuminated areas, when the road is normal ahead of the vehicle, but having non-overlapping areas in the case of an obstacle, ditch, or the like appearing at less than a predetermined distance ahead of the vehicle. With the focal length of the lenses for the photo-electric cell properly selected for throwing an image of this spot of overlapping light rays onto the sensitive portion of the cell, it is easy to see that any disturbance or obstruction to either of the light rays will either change the position or intensity of the spot and hence the intensity of light on the photo-electric cell, causing it to operate the vehicle stopping mechanism.

A further feature of the invention comprises the arrangement of the devices of the second embodiment in such a manner that the photo-electric cell functions to stop the vehicle only when illuminated. This may be accomplished by focusing the cell on a portion of the light beam where substantial reflection does not take place until an object or obstruction is interposed which will reflect sufficient light to activate the cell and stop the vehicle.

Various features and objects of the invention not already enumerated above will be apparent to those skilled in the art upon a consideration of the accompanying drawings and following specification, wherein are disclosed several exemplary embodiments of the invention with the understanding, however, that such further changes and variations may be made therein as fall within the scope of the appended claims without departing from the spirit of the invention.

In said drawings:

Figure 1 is a front elevation of an automobile equipped with apparatus constructed according to the present invention;

Figure 2 is a schematic and diagrammatic circuit arrangement and mechanical layout for apparatus of the present invention;

Figure 3 is a side elevation partly in section of a preferred form of photo-electric cell and mounting;

Figure 4 is a diagrammatic showing of apparatus for simultaneously controlling the amount of light falling on each of several cells;

Figure 5 is a plan view of a vehicle equipped with apparatus according to a second embodiment of the invention;

Figure 6 is a side view thereof illustrating the manner of focusing the light sources and the light sensitive cells on the same spots on the road; and Figure 7 is a diagrammatic view of a preferred form of light source.

The operation of automotive vehicles under present traffic conditions is attendant with numerous hazards, not the least of which are those resulting from running the vehicle against a moving or stationary obstacle, into a ditch or over an embankment. This may occur as the result of distraction of the driver's attention, failure to note the obstacle in time due to weather conditions and the like or in some cases from the disability of the driver either temporary or permanent. It is the object of the present invention to take the control of the vehicle away from the driver upon occasions when the vehicle approaches too closely to an obstacle or other source of danger ahead of it for safety or when it so approaches within the minimum stopping distance of which the vehicle is capable and to automatically stop the vehicle, thus materially reducing the possibilities of collisions of the type described.

The present invention is of general application, and for this reason certain features of the mechanism have not been shown or described in detail, but it is obvious that various known devices may be used for the purpose. The apparatus is entirely contained upon the vehicle itself and does not rely for its operation on extraneous sources of light or other waves, nor upon any other fixed or temporary conditions of the highway, track or other path of the vehicle except the occurrence of an obstacle or dangerous depression within a predetermined distance in front of the vehicle.

Incorporated in the vehicle are the three essential parts of the invention: First, a suitable photo-electric or light sensitive cell; second, a mechanism for automatically stopping the vehicle in any well-known manner; and third, means associating these two parts so that the second is under control of the first.

Referring now to the drawings of the first embodiment, there is shown in Figure 2 a light sensitive cell 10 associated, by suitable electric circuits 11, with a relay 12 all so arranged that when light of more than a predetermined intensity falls upon the cell 10 the relay armature remains attracted. When, however, light of less than this intensity, or none at all, falls upon the cell, the relay armature is released and closes a circuit through its back contact 13, a source of current 14 and a solenoid 15, representative of any suitable source of power, for operating mechanism for bringing the vehicle to a stop. For instance, as shown, the plunger armature 16 of the solenoid may be connected to a lever 17, pivoted at 18, and having a connection 19 leading to the brakes of the vehicle to apply them vigorously when the solenoid attracts its armature. At the end of the lever beyond the pivot 18 may be a portion 20 which will lift the accelerator, shut off the fuel supply, open the ignition circuit, or otherwise disable the source of power used for driving the vehicle so that the brakes can be more effective. It will be appreciated that the apparatus just described is entirely suggestive and aside, broadly, from its functions need not follow at all the brief description just given.

As seen in Figures 1 and 2, it is preferred to use a plurality of photo–electric cells 10, two of which are shown on the vehicle beneath each headlight 21 thereof and securely positioned between the shell 22 of the radiator and the apron 23 of the front fender with the cell windows facing forwardly. Any other suitable position for the cells may be found on the vehicle but preferably a low position as shown in order to be within the range of low obstacles or the rearmost projections on vehicles running in front.

The photo-electric cell may be any of the well-known types, such as the photo-electronic, photo-voltaic, photo-conductive, crystal-photo-cells or the like and of any variation of these. The type is independent of the invention but various ones may require slight modifications in circuit arrangement in order to properly control the mechanism for stopping the vehicle.

Shown in Figure 3 is a form of mounting which may be resorted to and wherein the cell 10 having the electrodes 30 and 31 is mounted within a light-tight chamber 32 preferably having an insulating bottom plate 33 and screw cap 34. As shown, the cell 10 is supported by springs 35 bearing against formed plates 36 pressing on the surface of the glass envelope. Likewise the conductors leading from the electrodes include springs 37 so that the cell is resiliently mounted and not subject to damage by shock. For damping purposes to prevent excessive vibration, the chamber 32 may be filled with cotton wool 38 or may be filled with a viscous liquid of suitable consistency, as for instance, glycerol. An aperture 40 in the casing opposite the window of the cell receives a light-tight tube 41 to the end of which is threadedly attached for adjustment a lens mount 42 containing the lens 43. This lens mount has a suitable flaring, overhanging mouth 44 to protect the lens from the weather and the opening in front thereof is controlled by variable diaphragm 45 to regulate the aperture of the lens and thus the intensity of the light falling on the cell.

Where a plurality of cells are used, as shown, it is convenient to have a single control for manipulating these diaphragms simultaneously and for the purpose a knob 50, shown in Figure 4, may be provided on the dash of the vehicle connected with a gear 51 with which are meshed a plurality of smaller gears 52, one for each cell and connected to the iris diaphragms 45 thereof by suitable flexible controls as the Bowden wires 53. The purpose of the diaphragms is to reduce the light intensity on the cells in broad daylight so that the light may be brought down to what may be considered a "normal intensity" so that a definite reduction in light from this intensity will serve to operate the device. For convenience, the knob may be fitted with a pointer moving over a scale marked "Clear" and "Cloudy" or "Bright" and "Dim" or certain other legends indicating the position to which it must be set in accordance with the weather conditions or the intensity of the atmospheric light.

The lens 43 is of a definite focal length and since such lenses focus fairly sharply over a certain range known as the "depth of focus", it may be considered that any object coming within this depth of focus will have its image cast on the sensitive portion of the photo-electric cell, thus reducing the light intensity thereon, and passing over the threshold value thereof required to operate the cell for the purpose of controlling the stopping mechanism.

If the normal focal length of the lens is say ten feet, then if the vehicle approaches within ten feet of an object, the mechanism will be actuated to stop the vehicle. The maximum focus of the lens should be approximately the stopping distance of the vehicle under normal conditions.

For the purpose of taking care of abnormal conditions such as wet or slippery weather, an additional cell or cells may be provided whose lenses are adjusted to a longer focal length so that the initiation of stopping is provided at a greater distance from the obstacle, giving the braking system a longer chance to operate under the less certain conditions. As shown in Figure 2, the one set of cells A may have their lenses adjusted for a long focal length and the other B for a short focal length, and selection is made by the two-way switch 55 which is manipulated by the driver to the proper position in accordance with the weather conditions.

Two cells 10 have been shown, connected in series, in each bank A and B and obviously any desired number may be used. Being connected in series, the failure of one cell to generate current, as on account of the image of an object ahead of the vehicle being thrown thereon, will prevent the flow of current from the remaining cells in the series and thus operate the stopping mechanism. Thus by having the cells distributed across the front of the vehicle they can each have a narrow field and yet any one be in control of the vehicle.

Each cell preferably faces or has its field of view directly forward, and not toward the ground, so that it normally obtains light reflected from various objects in the landscape and from the air, and has a fairly constant illumination from a field within the focal length of the lens. Thus the cell does not focus on dark objects at a great distance, which would cause stopping of the vehicle. It might be found necessary under certain circumstances to provide all vehicles with a dark panel across the rear to insure an adequate change of light intensity when a vehicle equipped with mechanism according to the present invention approaches.

The circuit from the relay to the solenoid 15 can be equipped with a manually operable switch 58 on the dash of the vehicle so that the driver can disable the device when parking or under conditions where it may be so desired. In order that the driver may be able to overtake and pass another vehicle without having the apparatus of the present invention stop his vehicle, or also that the driver may make a turn without stopping, a suitable switch 60 may be mechanically connected to the steering wheel so that on a turn of the wheel, for instance five or ten degrees, the device will be temporarily disabled and will thus permit overtaking and passing another car. However, on making a turn greater than forty-five degrees, for instance, the device will remain in operation by virtue of the stationary portion of the switch shown in Figure 2, which is now again engaged by the switch arm 60. This stationary portion comprises an arcuate section 61 having a central projection 62 to keep the device in operation when the vehicle is going straight ahead, the cutaway portions 63 for passing, and the outer contacts 64 for wider turns than forty-five degrees.

The apparatus shown in Figure 2 associating the photo-electric cells with the relay 12 may be of any desired type. There are certain photo-electric cells which will directly operate a sensitive relay which could then be connected to operate the relay 12 in a well known way. Any of the various thermionic relays may be used, such as the Thyraton, the grid glow tube or the ordinary amplifier. The first two are preferable since they can be set to have full on and off positions without intermediate positions so that by adjustment of, for instance, a resistance 65 a change can be made in the potential at which the current is turned on and off to accurately control the device for operation at certain definite light intensities. It is not considered that the specific showing in Figure 2 is the best that may be provided but it is merely representative of one form of control.

It may be desirable to provide for the relay 12 a type which closes rapidly but is slow-releasing, of which there are many. Under certain conditions improved results might be obtained by using various light filters, with the lenses and cells, to insure operation only when the image of an obstacle of certain color or density is thrown on the cells. Various other changes and additions may be resorted to for the purpose of improving operating characteristics, but since these are within the knowledge of those skilled in the art they are considered to be within the purview of this invention.

Under certain conditions the apparatus described above may not always give satisfactory operation and a second embodiment about to be described may sometimes be preferred. This embodiment does not rely on the use of ordinary daylight or light reflected by the atmosphere from the headlights. This second embodiment makes use of a definite intensity of light emitted from sources on the vehicle and hence controllable. One or more sources of light mounted on the vehicle are focused onto the ground at a definite distance ahead of the vehicle in the form of a small spot. These rays are preferably of a certain selected color, such as blue which is least absorbed and best reflected from various types of surfaces, and obviously the type of photo-electric cell is selected for best operation with this definite color of light. The lenses of the photo-electric cell, which may be constructed substantially identical with those shown in connection with the first embodiment of the invention, are aimed and focused to direct the light, from this spot illuminated on the road by the sources of light on the vehicle, directly on to the sensitive portion of the cell and the cell is so screened and shielded that only light from the direction and area of this is allowed to fall upon the sensitive surface.

The photo-electric cells in this embodiment may be mounted in the same positions and in the same manner as in connection with the first embodiment, but the aiming and focusing of the lenses may be slightly different as explained above. The cells are connected to operate through the same types of mechanisms and circuits as in the first embodiment of the invention and their function in stopping the vehicle is identical with that already described.

A reference now to the drawings depicting the second embodiment of the invention will make it evident how this form of the invention is carried out. Figures 5 and 6 illustrate a vehicle 75 which is equipped in a manner similar to that shown in Figure 1 with the two photo-electric cells 76 and 77 on each side thereof and preferably one above another although the positioning of the cells is subject to considerable variation without departing from the invention. The position shown is convenient and offers protection to the cells against damage. Likewise the manner is relatively unimportant as previously explained.

For each cell there is provided at least a single source of light so that in the present case there are four sources which should be located as high as convenient on the vehicle. Those indicated at 78 may be mounted on the top just above or beside the upper corners of the windshield and are intended for directing beams of light onto the road at a distance ahead of the car approximately equivalent to the stopping distance of the vehicle in bad weather. The second set of lights 79 can conveniently be mounted on the front fenders and have a shorter range, directing beams to the roadway at a distance of say eight feet ahead of the vehicle intended for use in fine weather when the stopping distance is shorter.

The lamps 78 and 79 may contain any suitable source of illumination and any convenient housing as well as means to focus the light into a substantially parallel beam. Various well-known devices are available for this purpose and detailed description need not be given here. It is sufficient to say that the beam is confined to almost a parallel path with only slight divergence so that on striking the road at the given distance ahead of the vehicle a sharply defined spot of small area is illuminated on the road surface. Because of the angularity of the beam, this spot will be generally elliptical in form, as clearly seen in Figure 5.

It is an important feature of the invention to provide a light of definite color so as to permit the light sensitive cell to distinguish it from, for instance, headlights, daylight, traffic or other signal lights and the like. The best color is perhaps blue, because of the fact that it is least absorbed and best reflected by most objects and does not occur in great preponderance in most ordinary lights. It is also practically absent in signal lights.

The light sources can be any ordinary light, such as the conventional incandescent lamp arranged with a suitable screen for color selection, or, as shown in Figure 7, they may be a glow or electric discharge type lamp, the advantage of which is the extreme preponderance of blue light which can be obtained and the rather close confining of the light to a definite narrow path, eliminating the need for lenses, reflectors and the like. This form of lamp is well-known and need not be further described except to say that it comprises an envelope 80 of glass, a cathode plate 81 at one end of the envelope and an anode 82 near the other end. As shown, the rays are projected normally from the plate and pass by the anode, which is pocketed as shown in the side of the cylinder. Such a lamp can be housed in any conventional protective mounting and provided with high tension current through the leads indicated.

Each photo-electric cell is preferably mounted as described and shown in connection with Figure 3 and is so adjusted and its lens so focused that the spot of light on the road from its lamp is thrown as an image onto the sensitive portion of the cell. All other portions of the cell are so shielded and screened by means heretofore described, or any other desirable means, as to prevent access of light from anywhere except the spot on which it is focused. The cell is, by well-known means, made most sensitive to the light of the particular color emitted by the lamp.

It can, for instance, be equipped with suitable filters. If, for instance, a cell is selected which is extremely sensitive to blue but also sensitive to other colors present in daylight and artificial light, a suitable filter may be provided to absorb all but the blue light. If under these conditions the cell is still so sensitive to blue as to be affected by the amount of blue in daylight, the filter must be altered by the addition of material which absorbs blue until the daylight effect is fully eliminated. This can readily be done since the local source of light is so much more rich in blue than interfering lights are.

With the vehicle equipped as just described and with suitable means for lighting only the set of lamps required, in accordance with weather conditions, as will be clear from the description of the previous embodiment, and with only the proper set of photo-electric cells connected as by switches similar to that shown at 55 in Figure 2, the apparatus is ready to operate. The proper lamps light spots on the road ahead of the vehicle of a predetermined color and of substantially constant intensity, which light is reflected back by the irregularities of the road surface to the cells energizing them and maintaining the stopping apparatus in its inoperative condition as explained in connection with the previous embodiment. However, if an obstruction appears before the vehicle, at least one spot of light from the lamps changes its position, and since each lamp and its corresponding cell are not on the same axis, the cell no longer is focused on the spot and receives only the image of the obstacle which is not of the proper color or intensity to energize the cell, so that it immediately causes the vehicle stopping mechanism to function. A ditch or the like suddenly coming within the range of the light permits the image to move further from the vehicle or drop down to a lower plane and move out of the focal distance and range of the photo-electric cell, thus effecting immediate stopping of the vehicle.

Rather than use a source of light for each cell it may be desirable to use a single source for each pair of cells on the same side, either tilting the lamp mechanically to make a change in the distance at which the spot strikes the ground or using a double filament lamp as in the present day headlights, making the change by an electrical switching operation. In either of these cases or in the case where several sets of lamps are used, one multiple switch, in a manner well-known, may be equipped to make the complete change-over of the cells connected to the stopping circuit and of the corresponding lights.

With a proper source of colored light and filters for the photo-electric cells, it becomes feasible to use one cell for stopping at each of the two selected distances for different weather conditions. This is effected by using two lens systems for the cell focused at the two distances. Only a change in the position of the proper colored beam is now necessary to change the working distance.

Sometimes it may be desired to use two lamps to provide each spot of light on the road, the rays coming from different directions and overlapping at this spot. Thus if the plane of the road suddenly changes as by the interposition of an obstacle, a curbstone, a ditch or the like, the two beams no longer coincide at the plane from which they are to be reflected, and hence the intensity is reduced to that of a single beam at any one spot and by proper adjustment of the cells the operation can be had in this manner without requiring such careful focusing of the cells.

The diaphragms as disclosed in Figure 3 of the drawings may be used to make adjustments in the quantity of light entering the cells to take care of the variations in the reflecting qualities of various roads and the intensity of normal light which may be thereon so that the cells are set to maximum sensitivity under all conditions.

Certain conditions may arise in which the devices operate best when the stopping of the vehicle is effected by illuminating the photo-electric cell rather than by darkening it. The cell is adjusted to operate only when illuminated with a predetermined intensity of light and is focused on a portion of the light beam where there is no substantial reflection under ordinary circumstances. With a road vehicle this would be at some position above the road level. An obstruction, however, coming into the junction of the beam and the point of focus of the cell would reflect sufficient light to stop the vehicle.

Such a form of the device may be particularly useful on boats, both surface and submarine, for protection in fog or from mines. If, for instance, the light source is beneath the water and the cell is focused onto a portion of the beam, reflection will only take place when an obstruction is approached by this junction, and apparatus can be provided to stop or reverse the vessel.

It will be seen that the essential feature of the second embodiment of the invention comprises a source of activating light carried by the vehicle projecting a beam forwardly thereof and with the photo-electric cell focused on a predetermined portion of the beam.

This application is a continuation in part of applicant's copending application Serial No. 699,279, filed November 22, 1933.

Having thus described the invention, what is claimed as new and desired to be secured by Letters Patent is:

1. Apparatus for controlling vehicles including in combination, a light sensitive cell subject to light from in front of the vehicle, a lens for said cell focusing only light within a definite distance in front of the vehicle onto said cell, control mechanism for the vehicle and means associating the cell and control mechanism to maintain the mechanism inoperative as long as the field of the lens is unobstructed within said definite distance.

2. Apparatus for stopping automobiles upon approaching an obstruction including in combination, a light sensitive cell on said vehicle, means exposing said cell to a limited light field forward of the vehicle for only a definite distance, and means to stop the vehicle upon the disturbance of said field by an obstruction to prevent light falling on said cell from the field.

3. Apparatus for stopping self-propelled vehicles upon approaching too close to an obstruction including in combination, a light sensitive cell carried by the vehicle and normally exposed to a predetermined limited field forward of the vehicle, vehicle stopping mechanism actuated to non-stopping position when the cell is illuminated and to stopping position when the cell is darkened, and means to focus said field upon said cell from only or less than a predetermined distance in front of the vehicle whereby only an obstacle within that distance has its image focused on the cell to darken the same.

4. Apparatus for stopping self-propelled vehicles upon approaching too close to an obstruction including in combination, a light sensitive cell carried by the vehicle and normally exposed to a field forward of the vehicle, vehicle stopping mechanism actuated to non-stopping position when the cell is illuminated and to stopping position when the cell is darkened, means to focus said field upon said cell for only a predetermined distance in front of the vehicle whereby an obstacle within that distance has its image focused on the cell to darken the same, and means to automatically disable the stopping mechanism as the vehicle is steered to turn through small angles.

5. Apparatus for stopping self-propelled vehicles upon approaching too close to an obstruction including in combination, a light sensitive cell carried by the vehicle and normally exposed to a field forward of the vehicle, vehicle stopping mechanism actuated to non-stopping position when the cell is illuminated and to stopping position when the cell is darkened, means to focus said field upon said cell for only a predetermined distance in front of the vehicle whereby an obstacle within that distance has its image focused on the cell to darken the same, and means to automatically disable the stopping mechanism as the vehicle is steered to turn through small angles and to condition it for operation when steered for turning through larger angles.

6. Apparatus for controlling vehicles including in combination, a light sensitive cell, means for stopping the vehicle when the cell is deenergized, and means for energizing the cell from normal day-light or from the normal atmospheric reflection of the vehicle headlights, said energizing means being effective only within a definite distance forward of the vehicle.

7. Apparatus for stopping self-propelled vehicles upon approaching too close to an obstruction including in combination, a light sensitive cell carried by the vehicle and normally exposed to a field forward of the vehicle, vehicle stopping mechanism actuated to non-stopping position when the cell is illuminated and to stopping position when the cell is darkened, and means to regulate the amount of light falling on the cell to compensate for variations in normal light intensities.

8. Apparatus for stopping self-propelled vehicles upon approaching too close to an obstruction including in combination, a photo-electric cell, a housing for said cell carried by the vehicle, an aperture in said housing to expose the cell to a field of normal illumination forward of the vehicle, vehicle stopping mechanism connected to the cell for operation thereby when not illuminated, and a lens associated with said aperture and adjusted to focus the cell throughout only a predetermined depth of focus of said field.

9. Apparatus for stopping self-propelled vehicles upon approaching too close to an obstruction including in combination, a photo-electric cell, a housing for said cell carried by the vehicle, an aperture in said housing to expose the cell to a restricted field of normal illumination forward of the vehicle, vehicle stopping mechanism connected to the cell for operation thereby when not illuminated, a lens associated with said aperture and adjusted to focus the cell throughout only a predetermined depth of focus of said field, a diaphragm and means adjustable from the driver's seat to actuate the diaphragm to regulate the aperture of said lens to set the apparatus for varying intensities of daylight and night illumination.

10. In controlling apparatus for self-propelled vehicles, the combination with a vehicle of an automatic mechanism for stopping the vehicle and a light sensitive cell associated with said mechanism to actuate it to stopping condition unless exposed to light of predetermined intensity, said cell being exposed to the normal atmospheric light directly ahead of the vehicle, and a lens adjusted to focus obstructions within a few feet only of the front of the vehicle onto said cell to reduce the light intensity thereon and stop the vehicle before engaging the obstruction.

11. Apparatus for controlling vehicles including in combination, a light sensitive cell mounted on said vehicle, a source of light mounted on said vehicle, means focusing the light as a small spot onto the road at a definite distance ahead of the vehicle, a lens focusing the spot onto the cell, stop mechanism for the vehicle and means associating the cell and stop mechanism to maintain the mechanism inoperative as long as the spot maintains its position in respect to the cell.

12. Accident prevention apparatus for vehicles including in combination, a light sensitive cell mounted on said vehicle and reacting to light only of a predetermined color and intensity, a source of light of said color mounted on the vehicle, means focusing the light into a spot of the required intensity and small area on the road at a predetermined distance ahead of the vehicle, a lens focusing the spot from that distance only onto the cell, stop mechanism for the vehicle and means associating the cell and mechanism to maintain the mechanism inoperative as long as the spot remains in the focus of said lens, said mechanism being actuated when the spot is removed from the focus of the lens.

13. Apparatus for controlling vehicles including in combination, a light sensitive cell on the vehicle energizable only by light of a predetermined color, means for stopping the vehicle only when the cell is deenergized, a source of light of said color on said vehicle, means projecting said light over a definite small area on the road at a predetermined distance ahead of the vehicle and means focusing only said area at said distance onto said cell to energize the same and prevent operation of the stopping means.

14. Apparatus for controlling vehicles including in combination, a light sensitive cell on the vehicle, means for stopping the vehicle only when the cell is deenergized, a source of light on said vehicle, means projecting said light in a restricted beam onto the road at a predetermined distance ahead of the vehicle, means focusing the image of the beam on the road onto the cell and excluding light from all other directions, said cell and light source being so disposed on the vehicle that lines from them to the said area converge at a considerable angle.

15. Apparatus for stopping self-propelled vehicles upon approaching too close to a source of danger comprising, in combination, means high up on the vehicle to project a narrow beam of light onto the road at a distance ahead of the vehicle substantially equivalent to the stopping distance of the vehicle, a photo-electric cell on the vehicle, means focusing said cell only onto the spot from said beam when on a normal road, means to stop the vehicle when the cell is deenergized, and means to prevent operation of the stopping means when the cell is energized by light from the source reflected from the road.

16. Apparatus for stopping self-propelled vehicles upon approaching too close to a source of danger comprising, in combination, a source of light on the vehicle projecting a beam forwardly from the vehicle, a photo-electric cell on the vehicle, means focusing the cell on a field including a portion of said beam at a predetermined distance ahead of the vehicle, and means to stop the vehicle actuated by a change in condition of the cell resulting from a change of light intensity thereon.

17. A safety appliance for use with a self-propelled vehicle including in combination a source of light carried by the vehicle and projecting a restricted beam forwardly from the vehicle, a photo-electric cell on the vehicle, means focusing the cell on a field within a predetermined distance ahead of the vehicle which field at times includes at least a portion of said beam and a translating device on the vehicle and so associated with the photo-electric cell as to be actuated by a change in condition of the cell resulting from a change of light intensity thereon.

MYER ROSENFELD.